(12) United States Patent
Sharma et al.

(10) Patent No.: US 10,509,167 B2
(45) Date of Patent: Dec. 17, 2019

(54) OPTICAL PHASE DIFFERENCE CALCULATION USING ANALOG PROCESSING

(71) Applicant: HEWLETT PACKARD ENTERPRISE DEVELOPMENT LP, Palo Alto, CA (US)

(72) Inventors: Amit S. Sharma, Palo Alto, CA (US); John Paul Strachan, San Carlos, CA (US); Marco Fiorentino, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/959,580

(22) Filed: Apr. 23, 2018

(65) Prior Publication Data
US 2019/0324205 A1 Oct. 24, 2019

(51) Int. Cl.
*G02B 6/12* (2006.01)

(52) U.S. Cl.
CPC ..... *G02B 6/12019* (2013.01); *G02B 6/12002* (2013.01); *G02B 2006/12061* (2013.01);
(Continued)

(58) Field of Classification Search
CPC ............ G02B 6/12019; G02B 6/12002; G02B 2006/12085; G02B 2006/12121;
(Continued)

(56) References Cited

U.S. PATENT DOCUMENTS

| 7,408,847 B2 | 8/2008 | Nikolai et al. |
| 7,995,202 B2 * | 8/2011 | Lundquist .................. G01J 3/02 |
| | | 356/317 |

(Continued)

FOREIGN PATENT DOCUMENTS

| JP | 2015-230259 A | 12/2015 |
| WO | 2018-055606 A1 | 3/2018 |

OTHER PUBLICATIONS

Dang, et al."Convlight: a Convolutional Accelerator with Memristor Integrated Photonic Computing," 2017 IEEE 24th International Conference on High Performance Computing (HiPC).
(Continued)

*Primary Examiner* — Akm E Ullah
(74) *Attorney, Agent, or Firm* — Hewlett Packard Enterprise Patent Department

(57) ABSTRACT

Systems and methods are provided for processing an optical signal. An example system may include a source disposed on a substrate and capable of emitting the optical signal. A first waveguide is formed in the substrate to receive the optical signal. A first coupler is disposed on the substrate to receive a reflected portion of the optical signal. A second waveguide is formed in the substrate to receive the reflected portion from the first coupler. A second coupler is formed in the substrate to mix the optical signal and the reflected portion to form a mixed signal. Photodetectors are formed in the substrate to convert the mixed signal to an electrical signal. A processor is electrically coupled to the substrate and programmed to convert the electrical signal from a time domain to a frequency domain to determine a phase difference between the optical signal and the reflected portion.

7 Claims, 3 Drawing Sheets

(52) U.S. Cl.
CPC ............. *G02B 2006/12085* (2013.01); *G02B 2006/12121* (2013.01); *G02B 2006/12128* (2013.01); *G02B 2006/12138* (2013.01)

(58) Field of Classification Search
CPC ........... G02B 2006/12128; G02B 2006/12138; G02B 6/12061; G02B 6/12138; G02B 6/12128; G02B 6/12121; G02B 6/12085
See application file for complete search history.

(56) References Cited

U.S. PATENT DOCUMENTS

| | | | |
|---|---|---|---|
| 9,280,748 B2 | 3/2016 | Nugent | |
| 9,807,825 B2 | 10/2017 | Van De Ven | |
| 10,109,348 B2* | 10/2018 | Hu | G06F 17/16 |
| 2008/0001062 A1* | 1/2008 | Gunn | G02B 6/12007 |
| | | | 250/206 |
| 2010/0166426 A1* | 7/2010 | Watanabe | H04B 10/2513 |
| | | | 398/81 |
| 2013/0058649 A1* | 3/2013 | Li | H04B 10/2572 |
| | | | 398/43 |
| 2015/0378187 A1 | 12/2015 | Heck et al. | |
| 2017/0178725 A1 | 6/2017 | Yang et al. | |
| 2017/0228345 A1* | 8/2017 | Gupta | G06F 17/141 |
| 2017/0323677 A1* | 11/2017 | Ge | G11C 11/24 |
| 2017/0358352 A1* | 12/2017 | Ge | G11C 13/0007 |
| 2018/0075357 A1* | 3/2018 | Subramanian | G06N 99/005 |

OTHER PUBLICATIONS

Li, et al. "A Memristor Crossbar-Based Computation Scheme with High Precision" Nov. 19, 2016, <https://arxiv.org/pdf/1611.03264.pdf >, 6 pages.

Search Report and Written Opinion received for PCT Application No. PCT/US2019/028462, dated Oct. 2, 2019, 7 pages.

* cited by examiner

OPTICAL PHASE DIFFERENCE CALCULATION USING ANALOG PROCESSING

BACKGROUND

Industrial and manufacturing facilities, such as plants and factories, may employ machinery and related processing equipment to automate or otherwise facilitate various aspects of processes carried out therein. For example, a manufacturing process may be carried out utilizing an assembly line to convey objects to various stations within a factory. Machines at each station may ascertain physical properties (e.g., velocity, position, and/or size) related to an approaching object to undertake the appropriate action (e.g., actuation of one or more components thereof) at the appropriate moment.

To ascertain the properties of the object, one or more sensors may be utilized. The sensors may interact with the object via WiFi based signals on a network. The information detected by the one or more sensors may be transmitted to a processing component communicatively coupled to the machine to provide the machine with information related to the physical properties of the approaching object. In some instances, the detected information may be inputs in one or more complex data processing algorithms. Accordingly, in such instances, the processing component may not be located at the edge of the network, but instead may be in the cloud or at a core data-center remote from the machine, resulting in increased latency.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
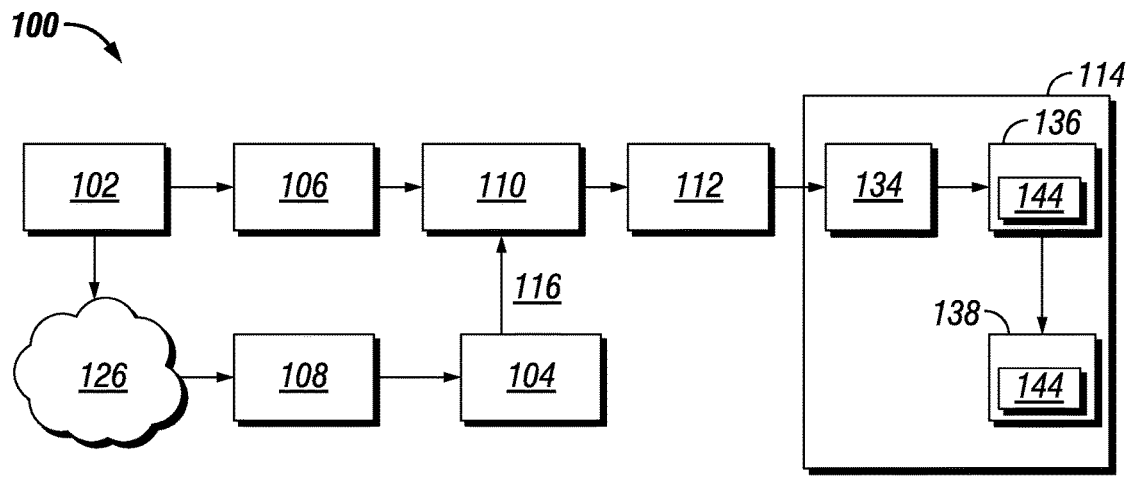
FIG. 1 illustrates a block diagram of a system for processing an optical signal, according to one or more embodiments of the disclosure.

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Embodiments of the present disclosure are directed to systems and methods for processing an optical signal. Example embodiments of the systems and methods disclosed herein provide for optical signal processing through the integration of silicon photonics and a processor including one or more memristor-based dot product engines for use in light detection and ranging (LiDAR) applications. One or more additional memristor-based dot product engines may be utilized for efficient deep neural network processing. One or more embodiments of the systems and methods disclosed herein include the integration of optical components on a silicon photonics semiconductor interposer, and a processor including memristor-based dot product engines, where the processor is directly flip chipped to the silicon photonics semiconductor interposer. Example optical components may include an optical source for generating and emitting the optical signal, a plurality of waveguides, a plurality of couplers, and one or more photodetectors.

The integration of the optical components and a processor including memristor-based dot product engines on an interposer may reduce manufacturing costs and may further reduce latency, thereby increasing performance. In addition, integration of the signal processing system onto a single interposer results in the reduction in size and footprint thereof, which is of benefit in edge computing deployments. Still further, embodiments of the systems and methods disclosed herein may have high reliability and resilience based on: the reduction in number of monolithic components; the non-volatile storage of neural network weights plus digital Fourier transform values in memristors providing continuous operation; and the temperature resilience of memristors due to high activation energy. Additionally, embodiments of the systems and methods disclosed herein may have improved security as the neural network weights are stored on the very-large-scale integration (VLSI) die, and the transmission of weights "off chip" may be eliminated.

Particularly, in one embodiment of the present disclosure, a system for processing one or more optical signals includes: a substrate; an optical source; a first waveguide; a first coupler; a second waveguide; a second coupler; one or more photodetectors; and a processor. The optical source may be disposed on the substrate that, in operation, emits an optical signal into free space. The first waveguide may be formed in the substrate to receive the optical signal from the optical source. The first coupler may be disposed on or formed in the substrate to receive a reflected portion of the optical signal. The second waveguide may be formed in the substrate to receive the reflected portion of the optical signal from the first coupler. The second coupler may be formed in the substrate to combine the optical signal form the first wave guide and the reflected portion of the optical signal from the second wave guide to form a linearly mixed signal. The one or more photodetectors may be formed in the substrate to convert the linearly mixed signal to an electrical signal. The processor may be electrically coupled to the substrate and programmed to convert the electrical signal from a time domain to a frequency domain and determine a phase difference between the optical signal and the reflected portion of the optical signal.

In another embodiment of the present disclosure, a method for processing one or more optical signals includes emitting an optical signal from an optical source disposed on a substrate, and receiving the optical signal from the optical source via a first waveguide formed in the substrate. The method may also include receiving a reflected portion of the optical signal via a first coupler disposed on the substrate, and receiving the reflected portion of the optical signal from the first coupler via a second waveguide formed in the substrate. The method may further include mixing, in a second coupler formed in the substrate, the optical signal from the first waveguide and the reflected portion of the optical signal from the second waveguide to form a linearly mixed signal. The method may also include converting the linearly mixed signal to an electrical signal via one or more photodetectors formed in the substrate. The method may further include converting the electrical signal from a time domain to a frequency domain to determine a phase difference between the optical signal and the reflected portion of the optical signal.

In another embodiment of the present disclosure, a system for processing a LiDAR optical signal includes: a silicon interposer; a quantum dot laser; a first waveguide; a first coupler; a second waveguide; a second coupler; one or more photodetectors; and a processor. The quantum dot laser may be disposed on the silicon interposer that, in operation, emits a LiDAR optical signal into free space in a direction perpendicular to a surface of the silicon interposer. The first waveguide may be formed in the silicon interposer to receive the LiDAR optical signal from the quantum dot laser. The first coupler may be disposed on or formed in the silicon interposer to receive a reflected portion of the LiDAR optical signal from an object in the free space at a distance from the system. The second waveguide may be formed in the silicon interposer to receive the reflected portion of the LiDAR optical signal from the first coupler. The second coupler may be formed in the silicon interposer to mix the LiDAR optical signal from the first waveguide and the reflected portion of the LiDAR optical signal from the second waveguide to form a linearly mixed signal. The one or more photodetectors may be formed in the silicon interposer to convert the linearly mixed signal to an electrical signal. The processor may be electrically coupled to the silicon interposer and programmed to: convert the electrical signal from a time domain to a frequency domain to determine a phase difference between the LiDAR optical signal and the reflected portion of the LiDAR optical signal; and calculate the distance of the object from the system based on the phase difference between the LiDAR optical signal and the reflected portion of the LiDAR optical signal.

Figure 2:
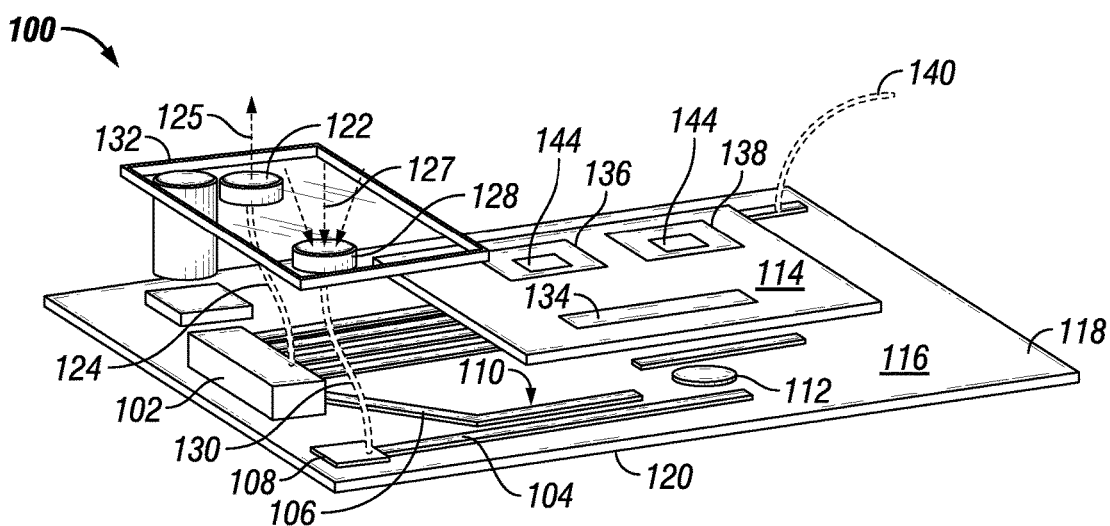
FIG. 2 illustrates a more detailed, perspective view of the system of FIG. 1, according to one or more embodiments of the disclosure.

Turning now to the Figures, FIG. 1 is a block diagram of a system 100 for processing an optical signal, according to one or more embodiments of the disclosure. FIG. 2 illustrates a more detailed, perspective view of the system 100, according to one or more embodiments of the disclosure. Implementations of the system 100 in the present disclosure are directed to LiDAR applications; however, the present disclosure is not intended to be limited thereto, and as such, the system 100 may be implemented in any suitable application conceivable by one of ordinary skill in the art including, but not limited to, WiFi, imaging, and video applications.

The system 100 may include an optical source 102, a plurality of waveguides 104, 106, a plurality of couplers 108, 110, one or more photodetectors 112, and a processor 114 disposed on or formed from a substrate 116. The substrate 116 may be an interposer, and in one or more embodiments, the substrate 116 may be constructed from a semiconductor material. For example, the semiconductor material may be or include a group IV semiconductor, such as silicon or germanium. In the example embodiments illustrated in FIGS. 1 and 2, the substrate 116 is a silicon interposer. As shown in FIG. 2, the substrate 116 may have a top surface 118 and a bottom surface 120, where the top surface 118 is planar or substantially planar.

The optical source 102 may be disposed on and bonded or otherwise attached to the top surface 118 of the substrate 116. In one or more embodiments, the optical source 102 may be assembled or grown in layers on the top surface 118 of the substrate 116. In one or more embodiments, the optical source 102 is a quantum dot laser. In the example embodiments illustrated in FIGS. 1 and 2, the optical source 102 is a quantum dot comb laser. Other suitable optical sources 102 may be or include, but are not limited to, bonded lasers, germanium lasers, and modulated lasers.

The optical source 102 may be constructed to generate and emit an optical signal vertically from the top surface 118 of the substrate 116. For the purposes of this disclosure, the term "vertically" refers to the direction perpendicular or substantially perpendicular (e.g., within 10 degrees from perpendicular) to the planar or substantially planar, top surface 118 of the substrate 116. The optical source 102 may include quantum confined material (not shown) disposed in an active region (not shown) of the optical source 102 to generate and emit the optical signal. In one or more embodiments, the quantum confined material may be quantum dots, and the optical signal may be an electromagnetic wave generated and emitted from a quantum dot laser.

In at least one embodiment, the optical signal is a plurality of electromagnetic waves, or lines, having different wavelengths generated and emitted from a quantum dot comb laser through a collimator lens 122 via an optical fiber 124. In one or more embodiments, the collimator lens 122 may be a component of a telescope (not shown) through which the optical signal is emitted. In some embodiments, the optical signal may be amplified via an optical amplifier (not shown) coupled to the optical source 102 and the collimator lens 122 prior to passing through the collimator lens 122. In such instances, the optical amplifier may be coupled to the optical source 102 and the collimator lens 122 via respective optical fibers or waveguides.

The electromagnetic waves of the optical signal are generally in the infrared wavelength spectrum; however, the present disclosure is not limited thereto, and in other embodiments, the electromagnetic waves may have any wavelength within the optical wavelength spectrum. The narrow range of the electromagnetic wave frequencies, small wavelength spacing, and narrow line widths provided by the comb laser output of the illustrated embodiment make the use of the quantum dot comb laser suitable for LiDAR applications. Further, the use of the quantum dot comb laser may output a natural linear chirp, thereby allowing for the omission of an electronic modulator in one or more embodiments.

The optical signal may be generated within the optical source 102 and emitted vertically (FIG. 2, arrow 125) from the top surface 118 of the substrate 116 into free space 126 (shown in FIG. 1) in the direction of a nearby object or objects (e.g., an identified target) located at a distance from the system 100 in the free space 126. The optical signal may contact the object(s), and at least a portion of the optical signal may be reflected. The reflected portion of the optical signal (also referred to herein as the return signal) may be diffused (FIG. 2, three arrows 127—only one indicated). The reflected portion of the optical signal may travel through an optical lens 128 optically coupled to a coupler 108 of the plurality of couplers 108, 110 via an optical fiber 130 to receive the reflected portion of the optical signal with minimal loss. Each of the optical lens 128 and the collimator lens 122 may be mounted to a platform 132 vertically spaced from the substrate 116. The coupler 108 may be disposed on or formed in the substrate 116. In the example embodiments illustrated in FIGS. 1 and 2, the coupler 108 is a grating coupler.

The plurality of waveguides 104, 106 may include a waveguide 104 optically coupled to the coupler 108 to receive and transmit therethrough the reflected portion of the optical signal. In one or more embodiments, the coupler 108 is a grating coupler integrated with an end portion of the waveguide 104 such that grating of the grating coupler is formed from the end portion of the waveguide 104 to form a SWG waveguide. The waveguide 104 may be formed from or otherwise integrated with the substrate 116. In one or more embodiments, the waveguide 104 may be a silicon photonic waveguide formed from the substrate 116. In another embodiment, the waveguide 104 may be a rib waveguide or a slot waveguide. The waveguide 104 may taper along the length thereof beginning from the end portion adjacent to or integrated with the grating coupler.

The plurality of waveguides 104, 106 may further include a waveguide 106 directly optically coupled to the optical source 102. The optical signal emitted from the optical source 102 may also be received by the waveguide 106. The waveguide 106 may be formed or otherwise integrated in the substrate 116 and positioned adjacent an active region (not shown) of the optical source 102, where the electromagnetic wave is undergoing amplification. The optical signal generated may couple into or otherwise travel into the waveguide 106 due to the physical proximity of the waveguide 106 to the active region of the optical source 102. The optical signal received by and traveling through the waveguide 106 may be referred to herein as a reference signal. In another embodiment, a splitter or like device may be coupled to the optical source 102 to direct a portion of the emitted signal from the optical source 102 to the waveguide 106.

Each of the waveguides 104, 106 may be optically coupled to a coupler 110 of the plurality of couplers 108, 110. Each of the reference signal and the return signal has a mode (electrical component and magnetic component orthogonal to one another) entering the respective waveguides 104, 106. Accordingly, the geometry of the waveguides 104, 106 may be shaped or otherwise configured to match the respective modes to one another upon entering the coupler 110.

In the example embodiments illustrated in FIGS. 1 and 2, the coupler 110 is a non-resonant coupler. The coupler 110 may receive the return signal from the waveguide 104 and may further receive the reference signal from the waveguide 106. Each of the reference signal and the return signal may be mode matched entering the coupler 110 based on the geometry of the waveguides 104, 106 so that the reference signal and return signal optical powers are added or otherwise mixed or combined to form a linearly mixed or otherwise combined optical signal. The non-resonant coupler 110, therefore, also functions as an optical mixer.

The linearly mixed optical signal may be transmitted to the one or more photodetectors 112. In one or more embodiments, the one or more photodetectors 112 may be or include one or more photodiodes. In another embodiment, the one or more photodetectors 112 includes a plurality of avalanche photodiodes. The plurality of photodetectors 112 may be formed from or integrated within the substrate 116. For examples, ions may be implanted into the substrate 116 to create the photodetectors 112. The plurality of photodetectors 112 may receive the linearly mixed optical signal and convert the linearly mixed optical signal to an electrical analog signal. The electrical analog signal is proportional to the total optical power and thus the square of the electromagnetic amplitude. The beat frequency of the electrical analog signal has an amplitude proportional to the product of the electric field amplitudes of the reference signal and the return signal.

The electrical analog signal may be directed to the processor 114. The processor 114 may be electrically coupled to the one or more photodetectors 112. In one or more embodiments, the processor 114 may be disposed on the substrate 116. In the example embodiments of illustrated in FIGS. 1 and 2, the processor 114 is flip chipped to the substrate 116 and electrically coupled to the one or more photodetectors 112 in a manner not shown but well known in the art. The processor 114 may be a microprocessor and may be or may be a component of an integrated circuit created via VLSI.

The processor 114 may include electrical circuitry 134 including an analog to digital converter or an analog sampling circuit to sample the electrical analog signal output from the photodetector(s) 112. The sampled electrical signal may be directed from the electrical circuitry 134 to one or more dot product engines 136 (one shown) programmed to perform a digital Fourier transform to convert the received sampled electrical signal including the phase difference from the time domain to the frequency domain to detect the exact magnitude of the phase difference. In one or more embodiments, the processor 114 may include a set of dot product engines 136 including one or more dot product engines 136. In at least one other embodiment, the processor 114 may include a plurality of dot product engines 136 arranged in an array. In one or more embodiments, the magnitude of the phase difference may be directly proportional to the transit time delta for the return signal and the reference signal and indicative of a parameter (e.g., distance from the system 100) of the detected object.

In another embodiment, the electrical circuitry 134 may include a chronometer or like device to count or otherwise measure a length of time between an optical signal emitted from the optical source 102 and the receipt of the return signal by the coupler 108. The length of time may be input into the processor 114 to determine a parameter (e.g., distance from the system 100) of the detected object. In such an embodiment, the coupler 110 may be omitted and the return signal may be transmitted to the photodetector(s) 112 from the coupler 108 via the waveguide 104.

Accordingly, the parameter (e.g., distance from the system 100) may be input into one or more dot product engines 138 (one shown) programmed to perform neural network processing to effect a real time decision or action. In one or more embodiments, the processor 114 may include a set of dot product engines 138 including one or more dot product engines 138. In at least one other embodiment, the processor may include a plurality of dot product engines 138 arranged in an array. In addition to the parameter based on the phase difference, the dot product engine 138 may receive one or more additional inputs from other systems or processes (e.g., WiFi, imaging, and video signals) communicatively coupled to the dot product engine 138 via a high-bandwidth interface 140 (FIG. 2) to effect a real time decision or action via neural network processing.

Figure 3:
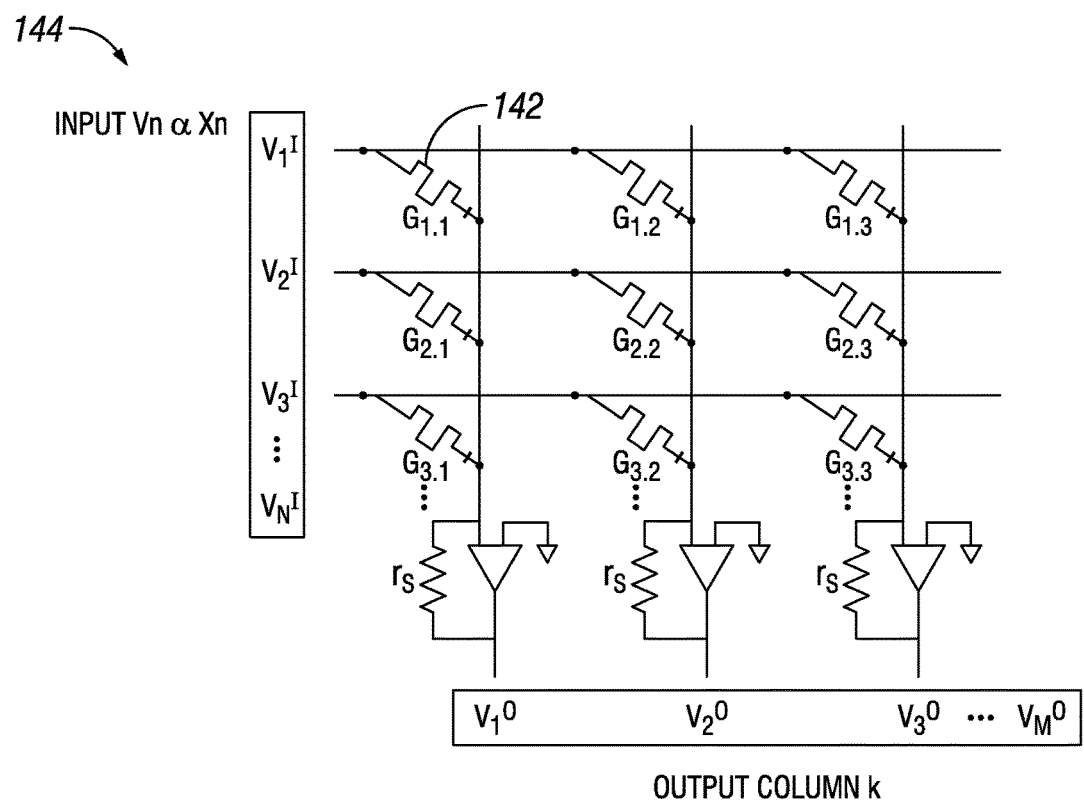
FIG. 3 illustrates a schematic of a memristor crossbar array structure, according to one or more embodiments of the disclosure.

Referring now to FIG. 3 with continued reference to FIGS. 1 and 2, each of the dot product engines 136, 138 may include an array of memristors 142 configured to perform as an analog computing device. To that end, the array of memristors 142 may be part of a memristor crossbar array structure 144. FIG. 3 illustrates a schematic of a memristor crossbar array structure 144, according to one or more embodiments of the disclosure.

Generally, the memristor crossbar array structure 144 may carry out vector-matrix multiplication in a single time step. The vector can be the optically-converted electrical signals, while the matrix is the operation to be performed on the vector, including signal processing (e.g., Fourier or Wavelet Transformation) or any other linear algebra matrix transformation. By applying a vector of voltage signals to the rows of a memristor crossbar array structure 144, multiplication by conductance of each memristor 142 is carried out by the KCL rule and the current is summed across each column. This "analog" method of vector-matrix multiplication may be orders of magnitude more efficient than a digital ASIC, particularly as the size of the memristor crossbar array structure 144 is scaled as large as is feasible. In addition to the increased efficiency, the use of the memristor-based dot product engines 136, 138 in a densely packed array of memristors 142 gives another factor of power reduction as opposed to a digital ASIC where the synaptic weights are stored in memory off of the chip.

The dot product engine 136 can also be used in real time computing Fourier transform. If input voltages represents different points in time of the signal in the time domain, and the weights represent cosine, sine values of different frequencies that are desired to decompose the signal into, then the memristor crossbar array structure 144 can be used to perform a digital Fourier transform in real time. As illustrated in FIG. 3, the memristor crossbar array structure 144 includes an input row n representing the nth quantized time step, and an output column k representing the calculated Fourier coefficient for the k/Nth frequency. Applied to the memristor crossbar array structure 144 are input voltages $V_n$ having $\alpha$ $x_n$, and the conductance on each memristor 142 (inverse resistance value of the memristor), which is $G_{n,k}$ having a value of $\sin(2\pi kn/N)$ or $\cos(2\pi kn/N)$ where k represents the k/Nth frequency bin. The current output is the aggregate of the product of the voltage inputs applied to the rows of the memristor crossbar array structure 144 (conductance).

In one or more embodiments, the distance determined by the dot product engine 136 may be utilized to form a 3D point cloud of the detected object. In such an embodiment, the optical source 102 may emit a plurality of optical signals. The system 100 may include an array of couplers 108 to receive the respective return signals via the optical lens 128. The system 100 may include a plurality of waveguides 104 formed in the substrate 116, each waveguide 104 to receive the respective return signal from the respective coupler 108. Each of the return signals from the waveguides 104 may be mixed with the optical signal in the coupler 110 to form respective linearly mixed signals. The system 100 may further include an array of photodetectors 112 formed in the substrate 116 to convert the respective linearly mixed signals to electrical signals. The electrical signals may be sampled in the electrical circuitry 134 and directed in parallel to a plurality of dot product engines 136 programmed to perform a digital Fourier transform to convert the received sampled electrical signals including the phase difference from the time domain to the frequency domain to detect the exact magnitudes of the phase differences. The magnitudes of the phase differences may be utilized to form a 3D point cloud of the detected object.

Figure 4:
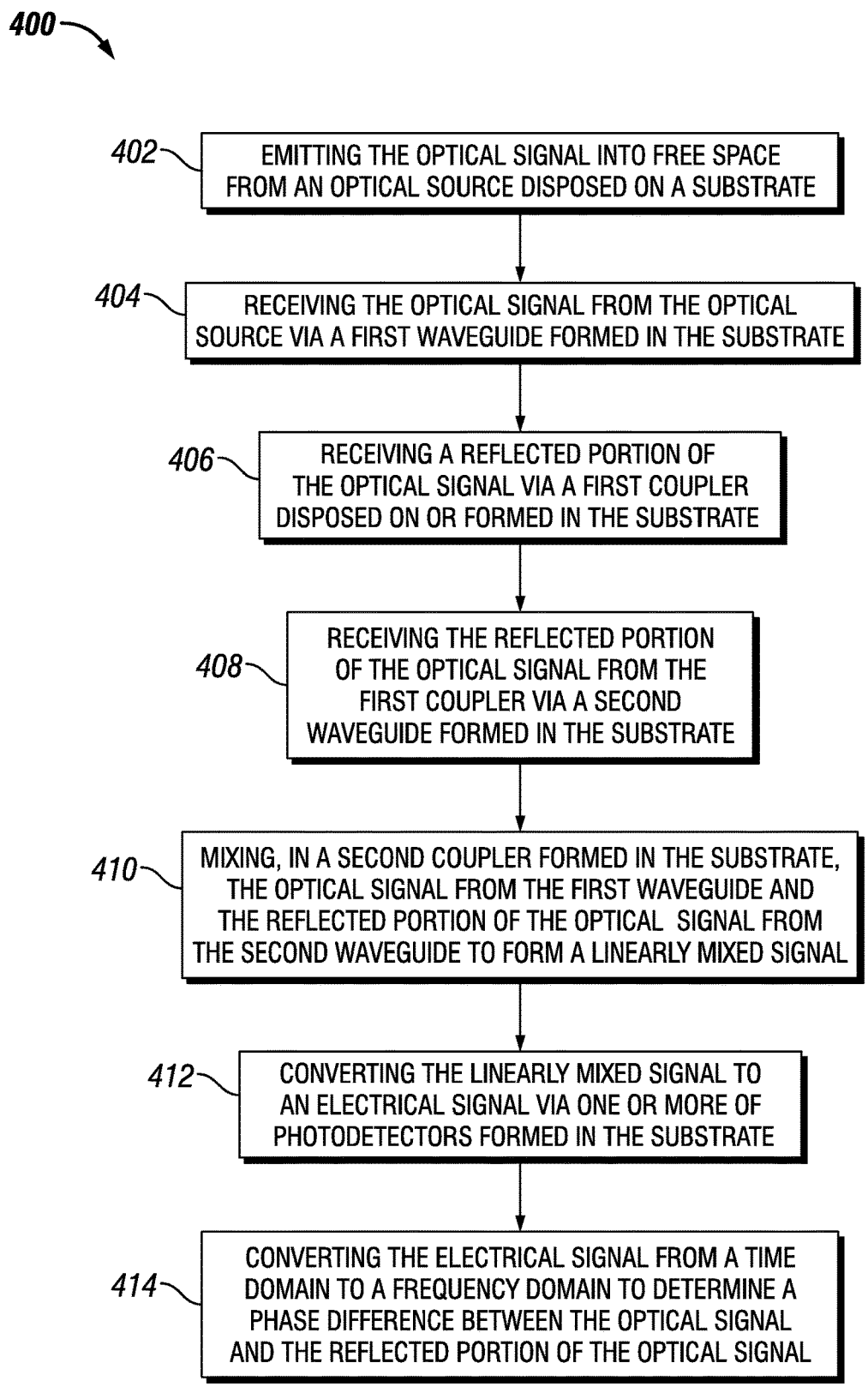
FIG. 4 is a flowchart depicting a method for processing an optical signal, according to one or more embodiments of the disclosure.

Referring now to FIG. 4 with continued reference to FIGS. 1-3, FIG. 4 is a flowchart depicting a method 400 for processing one or more optical signals. The method 400 may include emitting an optical signal into free space from an optical source disposed on a substrate (block 402). The method 400 may also include receiving the optical signal from the optical source via a first waveguide formed in the substrate (block 404), and receiving a reflected portion of the optical signal via a first coupler disposed on or formed in the substrate (block 406).

The method 400 may further include receiving the reflected portion of the optical signal from the first coupler via a second waveguide formed in the substrate (block 408), and mixing, in a second coupler formed in the substrate, the optical signal from the first waveguide and the reflected portion of the optical signal from the second waveguide to form a linearly mixed signal (block 410). The method 400 may also include converting the linearly mixed signal to an electrical signal via one or more photodetectors formed in the substrate (block 412), and converting the electrical signal from a time domain to a frequency domain to determine a phase difference between the optical signal and the reflected portion of the optical signal (block 414).

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A system for processing one or more optical signals, comprising:
    a substrate;
    an optical source disposed on the substrate that, in operation, emits an optical signal into free space;
    a first waveguide formed in the substrate to receive the optical signal from the optical source;
    a first coupler disposed on or formed in the substrate to receive a reflected portion of the optical signal;
    a second waveguide formed in the substrate to receive the reflected portion of the optical signal from the first coupler;
    a second coupler formed in the substrate to mix the optical signal from the first waveguide and the reflected portion of the optical signal from the second waveguide to form a linearly mixed signal;
    one or more photodetectors formed in the substrate to convert the linearly mixed signal to an electrical signal; and
    a processor electrically coupled to the substrate and programmed to:
        convert the electrical signal from a time domain to a frequency domain and determine a phase difference between the optical signal and the reflected portion of the optical signal; and
        calculate a distance of an object in the free space from the system based on the phase difference between the optical signal and the reflected portion of the optical signal,
    wherein the processor comprises:

a sampling circuit communicatively coupled to the one or more photodetectors to sample the electrical signal to form a sampled electrical signal;

a first set of dot product engines communicatively coupled to the sampling circuit to receive the sampled electrical signal and to perform a digital Fourier transform to convert the sampled electrical signal from the time domain to the frequency domain to determine the phase difference between the optical signal and the reflected portion of the optical signal; and calculate the distance of the object in the free space from the system based on the phase difference between the optical signal and the reflected portion of the optical signal; and a second set of dot product engines communicatively coupled to the first set of dot product engines and an external interface to receive a plurality of inputs including the distance of the object in the free space and to perform neural network processing to determine a real time action.

2. The system of claim 1, wherein:

each dot produce engine of the first set of dot produce engines includes a first plurality of memristors arranged to perform the digital Fourier transform to convert the sampled electrical signal from the time domain to the frequency domain to determine the phase difference between the optical signal and the reflected portion of the optical signal, the first plurality of memristors being capable of non-volatile storage of values of the digital Fourier transform; and each dot produce engine of the second set of dot product engines includes a second plurality of memristors arranged to perform the neural network processing to determine the real time action, the second plurality of memristors being capable of non-volatile storage of synaptic weights of a neural network.

3. The system of claim 1, wherein the optical source, in operation, emits a plurality of optical signals into the free space, and the system further comprises:

an array of first couplers disposed on or formed in the substrate, each first coupler to receive a reflected portion of a respective optical signal of the plurality of optical signals;

a plurality of second waveguides formed in the substrate, each second waveguide to receive the reflected portion of the respective optical signal from the respective first coupler;

a second coupler formed in the substrate to mix the optical signal from the first waveguide and each of the reflected portions of the respective optical signals from the second waveguides to form respective linearly mixed signals; and an array of photodetectors formed in the substrate to convert the respective linearly mixed signals to electrical signals, wherein the processor is programmed to convert the respective electrical signals from a time domain to a frequency domain and determine a phase difference between the optical signal and the reflected portion of the respective optical signal, and to form a 3D point cloud of an object in the free space based on the phase differences.

4. The system of claim 1, wherein the processor is flip chipped to the substrate.

5. The system of claim 1, wherein the optical source is a quantum dot laser that, in operation, emits the optical signal substantially perpendicularly from a surface of the substrate, and the optical signal is an optical frequency comb.

6. The system of claim 1, wherein the one or more photodetectors include one or more avalanche photodiodes.

7. The system of claim 1, wherein the first coupler is a grating coupler, the second coupler is a non-resonant coupler, and the first waveguide and the second waveguide are configured such that a mode of the optical signal traveling through the first waveguide and a mode of the reflected portion of the optical signal traveling through the second waveguide are matched.

* * * * *